United States Patent
Wiseman

(10) Patent No.: US 9,863,159 B2
(45) Date of Patent: Jan. 9, 2018

(54) SEALED COVER FOR POOLS WITH SEALED SLEEVES CONTAINING FLOATING RODS

(71) Applicant: Eithan Wiseman, Beit Shaan (IL)

(72) Inventor: Eithan Wiseman, Beit Shaan (IL)

( * ) Notice: Subject to any disclaimer, the term of this patent is extended or adjusted under 35 U.S.C. 154(b) by 18 days.

(21) Appl. No.: 15/156,054

(22) Filed: May 16, 2016

(65) Prior Publication Data

US 2017/0328079 A1 Nov. 16, 2017

(51) Int. Cl.
*E04H 4/10* (2006.01)
*B32B 3/08* (2006.01)
*B32B 3/28* (2006.01)
*B32B 5/18* (2006.01)
*B32B 7/04* (2006.01)
*B32B 27/30* (2006.01)

(52) U.S. Cl.
CPC ............. *E04H 4/101* (2013.01); *B32B 3/08* (2013.01); *B32B 3/28* (2013.01); *B32B 5/18* (2013.01); *B32B 7/045* (2013.01); *B32B 27/304* (2013.01); *E04H 4/106* (2013.01); *B32B 2250/03* (2013.01); *B32B 2250/246* (2013.01); *B32B 2266/025* (2013.01); *B32B 2307/7265* (2013.01)

(58) Field of Classification Search
CPC ........ Y10T 428/239; E04H 4/10; E04H 4/106
USPC .......................................................... 428/76
See application file for complete search history.

(56) References Cited

U.S. PATENT DOCUMENTS

2013/0019392 A1* 1/2013 Egger ..................... E04H 4/106
4/502

FOREIGN PATENT DOCUMENTS

DE 2638192 A1 * 3/1978 ............... E04H 4/10

OTHER PUBLICATIONS

Machine translation of DE 2638192 A1 retrieved Aug. 2016.*

* cited by examiner

Primary Examiner — Alexander Thomas

(57) ABSTRACT

A floatable flexible sealed waterproof cover for pools, made of a flexible waterproof bottom sheet, a flexible waterproof upper sheet and several rods made of a foam material. The bottom sheet and the upper sheet are welded to each other on their four sides. The upper sheet and the bottom sheet are connected by a number of lines that construct hollow sleeves between them and the rods are inserted into the sleeves.

1 Claim, 3 Drawing Sheets

SEALED COVER FOR POOLS WITH SEALED SLEEVES CONTAINING FLOATING RODS

FIELD OF THE INVENTION

The present invention refers to a sealed floating cover for swimming pools, which is intended to maintain pool water temperature, reduce the rate of chlorine evaporation from pool water and serve as a barrier protecting from falling into the pool or preventing children from entering the waters pool when it is not in operation.

INTRODUCTION AND PREVIOUS KNOWLEDGE

It is a common practice to heat the water of swimming pools to a specific temperature. When the water surface is exposed to air, the water temperature decreases relatively intensively, therefore, there is a need to apply extra energy in order to maintain the desired temperature of the pool. Furthermore, it is commonly accepted to add chlorine to disinfect the water of bacteria, and it is known that chlorine actively evaporates from water, especially when the latter is exposed to direct sunlight. As well, in many cases, particularly with private swimming pools, there is a fear that children may enter the swimming pool or, God forbid, fall into a swimming pool if they are not taken a proper adult care of. The method and the cover subject matter of the present invention are intended to effectively solve these problems concerning swimming pools and pools of various kinds.

LIST OF DRAWINGS

The intention of the drawings attached to the application is not to limit the scope of the invention and its application. The drawings are intended only to illustrate the invention and they constitute only one of its many possible implementations.

Figure 1:
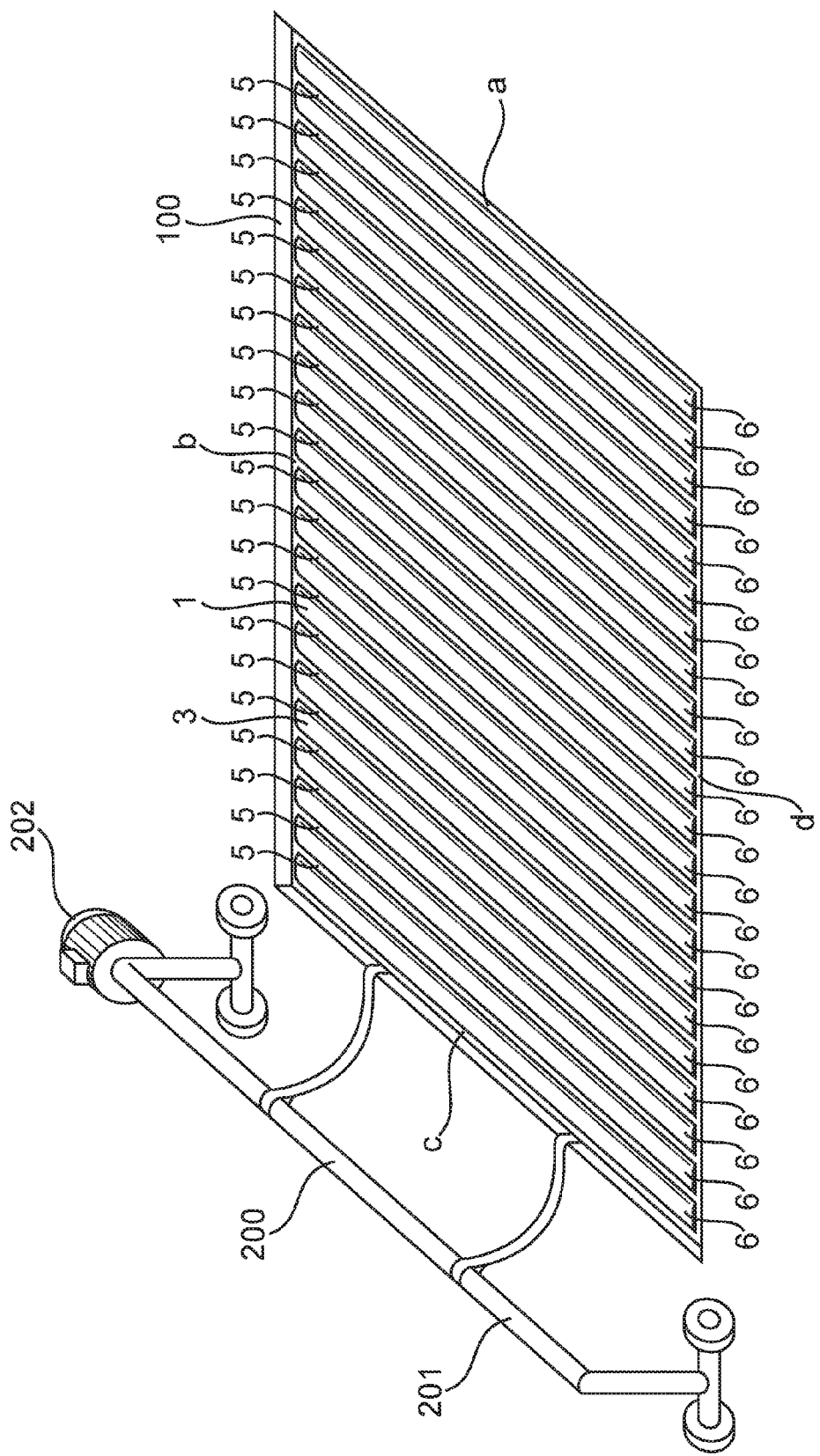

FIG. 1 describes the cover (1) of the pool (100) and is combined with a scrolling mechanism (200).

Figure 2:
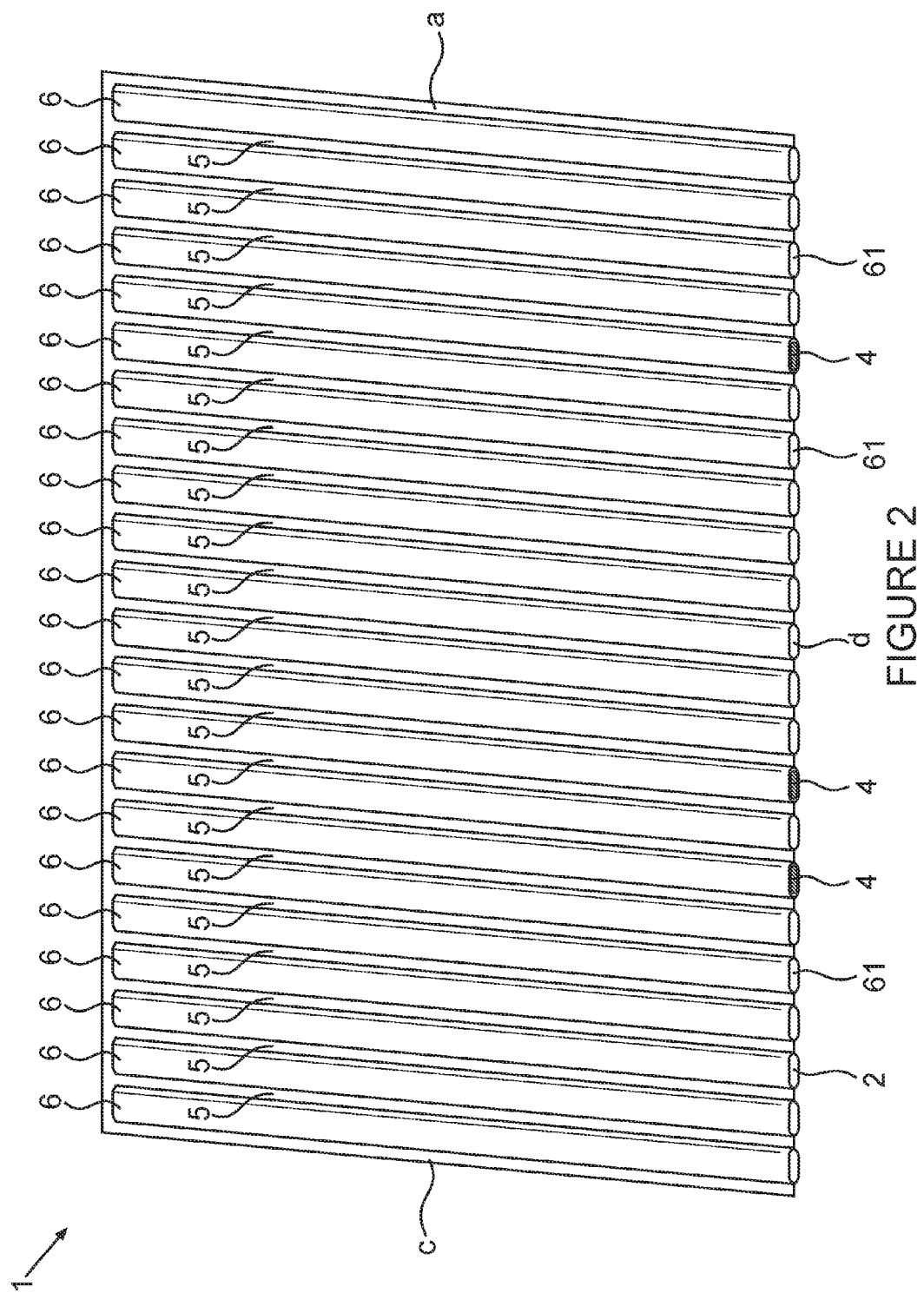

FIG. 2 describes the cover (1), whereby side d remains open and allows the rods (4) to penetrate the sleeves (6).

Figure 3:
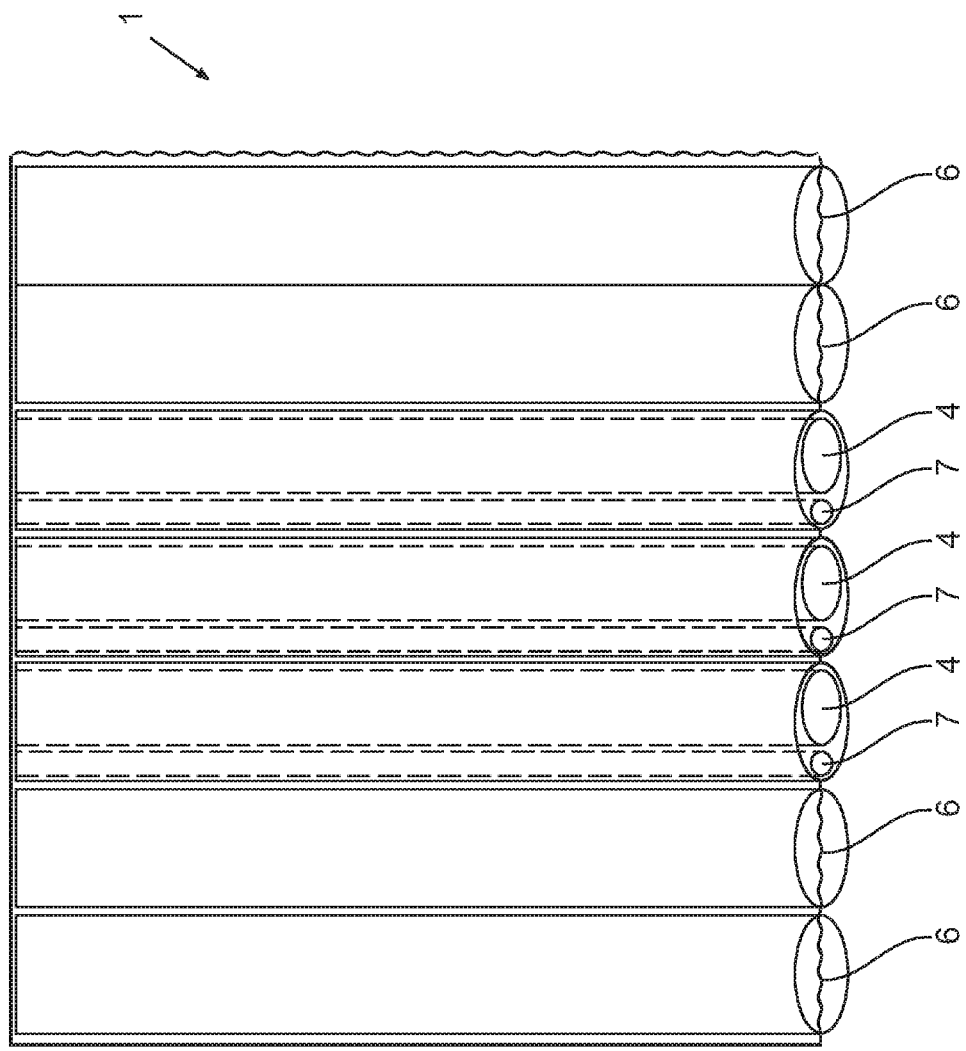

FIG. 3 describes a piece of the cover (1), whereby the sleeves also include a hard rod (7).

INVENTION DETAILS

The main goal of the present invention is to provide a waterproof flexible floating cover for swimming pools, intended to maintain water temperature in the pool, to reduce the rate of chlorine evaporation from pool water as well as to serve as a barrier from falling into the pool or preventing children from entering the pool when it is not in operation. An additional goal of the present invention is to equip the aforementioned cover with an electric scrolling mechanism. The given references are related to the cover (1) intended for swimming pools, though the word "pool" (100) may refer to all kinds of pools, reservoirs, open containers, closed containers and various things containing water or other liquids.

The sealed cover (1) for swimming pools is made of a flexible waterproof bottom sheet (2), a flexible waterproof upper sheet (3) and several rods made of foam material (4). The flexible waterproof sheets (2) and (3) are made of waterproof flexible material, such as PVC and the like. The rods (4) are made of foam materials of law specific weight that able to float on the water. For instance, polyethylene is foamy and has a low degree of density, which makes it easy to float on water surface and usable as thermal insulation.

Preparation and manufacturing of the sealed cover (1) can also teaches its structure the. First, we prepare a pair of flexible sealed sheets of the desired size and matching the size of the pool the cover is intended for. These pair of sheets is in fact the bottom and the upper sheets (2) (3). At the second step, we put the first sheet on the second one in parallel. At the third step, we weld together three sides (a) (b) (c) of the pair of sheets so that they become as one unit with open side (d). After that, we weld sheets (2) and (3) in lines (5) that creates closed sleeves (6) that their opening (61) ends in the open side (d). Obviously, it is possible to weld the lines (5) and afterwards the sides (a) (b) (c). At the fourth step, inserting the rods (4) into the sleeves (6) via the openings (61) and then welding the openings (61).

The structure of the cover (1): from the above explanation how to make the cover (1) it is understood that the cover (1) comprises a bottom and a upper sheets (2) (3) which are welded together in four sides (a) (b) (c) (d) and that these sheets include several hollow sleeves (6) in which the rods (4) are inserted. It is desirable and possible that the width of the each sleeve (6) will be about 20 cm, although the invention can be applied to various sizes.

Using the cover (1): The cover (1) is lightweight in relation to its volume. An average person can alone cover a pool by the cover (1) and to unfold the cover (1) after use, and also to carry the cover to the edge of the pool and unfold it on the surface of the pool water. The sleeves (6) are sealed, so that the water does not get inside. If the sleeves were not sealed, the weight of the cover (6) would be very high, which could be harmful for its expected form/shape, and above that, make it impossible for an average person to remove the cover from the pool before using the pool without assistance.

Effective use of the cover (1): the cover serves as a thermal insulator, prevent direct sunlight and can also prevent children from entering the pool without a proper adult care. As above mentioned, the rods (4) are made of a foam material with insulating characteristic, so that the cover (1) can serve as a good and effective thermal insulator. This feature of the cover (1) reduces the amount of energy necessary for heating the water pool. In addition, the cover (1) blocks a direct sunlight to the water, so that the pool water is covered, and reduces the level of chlorine evaporation from the pool water. It is true both for swimming pools and for purification pools and for other pools, when it is customary to add sanitation materials to the water. In addition, a child of an average weight can walk on the cover (1) lying on the surface of the pool while the cover (1) remains stable and does not let the child fall into the water. It is important to emphasize that, despite all features of the invention, the cover (1) will not replace a proper adult care of children or stop them from entering the pool at the time they are not supposed to do it. The cover (1) only provides extra protection.

The cover (1) can be combined with a scrolling mechanism (200), which includes a scrolling rod (201) and an engine (202) that can be an electric engine, intended for work in water environment.

FIG. 1 describes the cover, which covers a surface of a swimming pool (100), combined with the scrolling mechanism (200). FIG. 2 describes the cover (1), whereby side d remains open and allows the rods (4) to be inserted into the sleeves (6).

Rigid rods (7) for stabilizing the cover (1): the cover (1) can include a rigid rod (7) in each of said sleeves (6) or in part of them. The rigid rods (7) are made of a low specific weight hard material, for example, a fiberglass. If an adult person is standing on the edge of the cover (1) when the cover covers the pool, the edges of the cover do not plunge into the water. This is because the weight of the same person is "spread" along the length of the sleeves and the rigid rods and thus prevents the cover from sinking. FIG. 3 describes a part of the cover (1), whereby the sleeves (6) include a rigid rod (7)

The cover (1), as it is understood from the above explanations and the figures, includes several hollow sleeves (6) that are parallel one to each other as described for example in the figures, and it is possible that the cover (1) will includes five or even more parallel hollow sleeves (6), constructed by four or more parallel lines (5), as described in the figures. Each of said rods (4) is inserted into each of said parallel hollow sleeves (6). The cover (1) also includes several rigid rods (7) and it is possible that the cover (1) will includes at least three rigid rods (7) as depicted for example in FIG. 3.

What is claimed is:

1. A floatable flexible sealed waterproof cover for pools, comprising: a flexible waterproof bottom sheet, a flexible waterproof upper sheet, five or more rods made of a foam material, and three or more rigid rods; wherein the bottom sheet and the upper sheet are welded to each other on their four sides; wherein the upper sheet and the bottom sheet are connected by four or more parallel lines that construct five or more parallel hollow sleeves between said bottom sheet and said upper sheet; wherein said five or more rods are inserted into said five or more parallel hollow sleeves; wherein said three or more rigid rods are inserted into three or more of said five or more parallel hollow sleeves.

* * * * *